United States Patent [19]

Funasaki et al.

[11] Patent Number: 4,956,407
[45] Date of Patent: Sep. 11, 1990

[54] POLYMER COMPOSITION

[75] Inventors: Kazushige Funasaki; Kenji Tajima; Toshinori Yukino; Hiroshi Yamanoi, all of Urawa, Japan

[73] Assignee: Adeka Argus Chemical Co., Ltd., Tokyo, Japan

[21] Appl. No.: 399,362

[22] Filed: Aug. 28, 1989

Related U.S. Application Data

[63] Continuation of Ser. No. 175,309, Mar. 30, 1988, abandoned.

[30] Foreign Application Priority Data

Apr. 10, 1987 [JP] Japan .................................. 62-87992
Apr. 24, 1987 [JP] Japan ................................ 62-101464

[51] Int. Cl.⁵ .......................... C07F 9/15; C08K 5/524
[52] U.S. Cl. .................................... 524/120; 524/505; 524/537; 524/538; 524/539
[58] Field of Search ............... 524/120, 505, 537, 538, 524/539; 175/309

[56] References Cited

U.S. PATENT DOCUMENTS

| | | | |
|---|---|---|---|
| 3,888,752 | 6/1975 | Eldred .................................. | 524/120 |
| 4,088,709 | 5/1978 | Seymour et al. ..................... | 524/120 |
| 4,258,153 | 3/1981 | Yomamoto et al. ................. | 524/120 |
| 4,371,647 | 2/1983 | Minagawa et al. .................. | 524/120 |
| 4,385,145 | 5/1983 | Horn, Jr. .............................. | 524/120 |
| 4,390,477 | 6/1983 | Axelrod ............................... | 524/120 |
| 4,692,539 | 9/1987 | Spivack ................................ | 524/120 |

Primary Examiner—Kriellion Morgan
Attorney, Agent, or Firm—Barnes, Kisselle, Raisch, Choate, Whittemore & Hulbert

[57] ABSTRACT

A polymer composition comprises a polymer blend comprising a polyester and a polycarbonate or another polymer blend comprising alpha-methylstyrene-modified ABS resin and at least one polymer selected from a polycarbonate, a saturated polyester, polyphenylene ether, a polyamide and a polyacetal and an organic phosphite compound having the formula (I):

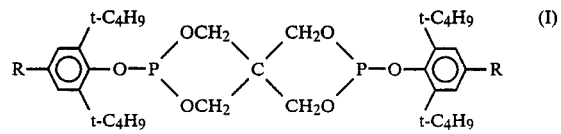

in which R is an alkyl having 1 to 9 carbon atoms.

3 Claims, No Drawings

POLYMER COMPOSITION

This application is a continuation of application Ser. No. 175,309, filed Mar. 30, 1988, now abandoned.

The invention relates to a polymer composition. In particular, the invention is directed to a polyester polymer composition which is unexpectedly improved in the impact strength, the thermal stability and crystallizability and is found to be useful for molded articles. Then it is drawn to an improved engineering plastic composition comprising an α-methylstyrene-modified ABS resin and a specific organic phosphite compound.

STATEMENT OF PRIOR ARTS

Thermoplastic polyester resins represented by polybutylene terephlhalate are rapidly finding wide applications because of their features such as excellent crystallizability, easy production of excellent moldings at a rapid cycle, very low water absorption, good dimensional stability, excellent chemical resistance and electrical characteristics, and a marked improvement in the properties through glass fiber reinforcement. However, because of the excellent crystallizability, the thermoplastic polyester resins are unsatisfactory in the impact strength, tend to bring about warpage in the case of glass fiber reinforced products, and lower the surface gloss. Further, since the Tg value is low, the rigidity at high temperatures is inferior to that of polyacetal etc. In order to make up for these drawbacks with respect to practical use, studies on polymer blends are very active, and a number of combinations of polymers are examined.

For example, polycarbonate has a Tg as high as 150° C. and excellent impact resistance and, therefore, is expected to enable the modification of the resin by taking advantage of these characteristics. In fact, many studies thereon have been made, and the commercialization thereof is in progress. As is well known, however, the melt mixing of polybutylene terephthalate with polycarbonate brings about random copolymerization because of the occurrence of an ester exchange, thus causing decomposition, foaming, and discoloration. A method in which a polymer having an amide group, an organic phosphite, graphitized polybutadiene, or the like is added has been proposed as an expedient for preventing these phenomena. However, this method was yet unsatisfactory, and a further improvement has been desired.

Since engineering plastics, such as polycarbonate, saturated polyester, polyamide, polyphenylene ether or polyacetal resin, have excellent thermal characteristics and mechanical characteristics, they are widely used in themselves or after reinforcement with a glass fiber or the like for various applications.

However, even these engineering plastics are often unsatisfactory with respect to the mechanical strengths. In order to improve the mechanical strengths, modification with other polymer(s), other fiber(s) such as carbon fiber, additive(s), etc. is widely utilized for practical purposes.

For example, in order to improve the low notch impact strength which is one of the drawbacks of the engineering plastics, modification with an acrylic rubber-containing polymer has been conducted. However, this method exhibits only an unsatisfactory effect and cannot impart a desired notch impact strength, which imposes a limitation with respect to the applications on the engineering plastics.

The addition of butadiene-containing polymer(s), such as MBS resin or ABS resin, was attempted as an expedient for improving the notch impact strength of the engineering plastics. However, these resins cannot be incorporated in a large amount because they have each a low thermal deformation temperature. Therefore, no satisfactory improvement could be attained. For this reason, the use of an α-methylstyrene-modified ABS resin having a high thermal deformation temperature was also attempted Since, however, the butadiene-containing polymers are poor in the thermal stability, despite the use of a necessary antioxidant in the preparation process, they cause rapid thermal deterioration and a remarkable change in the color tone when they are incorporated in an engineering plastic and then processed because the processing temperature of the engineering plastic is usually as high as 240° C. or above, which renders these polymers unsatisfactory from the practical viewpoint although they can provide excellent results with respect to an improvement in the impact strength.

SUMMARY OF THE INVENTION

The present inventors have made extensive and intensive studies with a view to solving the above-described drawbacks. As a result, the present inventors have found that a thermoplastic polyester polymer blend composition having remarkably improved crystalline properties, very excellent thermal stability, and excellent impact strength can be prepared by the addition of a specific organic phosphite compound to a polymer blend comprising a polyester resin and a polycarbonate resin, thus accomplishing the present invention.

The present inventors have made extensive and intensive studies with a view to solving the above-described drawbacks of the engineering plastics. As a result, the present inventors have found that an engineering plastic composition which is less susceptible to thermal deterioration and exhibits excellent moldability and high notch impact strength can be prepared by adding a specific organic phosphite compound in improving an engineering plastic with an α-methylstyrene-modified ABS resin, thus accomplishing the present invention.

The invention provides a polymer composition which comprises (A) a polymer blend comprising (a-1) a polyester and (a-2) a polycarbonate or (B) a polymer blend comprising (b-1) α-methylstyrene-modified ABS resin and (b-2) at least one polymer selected from a polycarbonate, a saturated polyester, polyphenylene ether, a polyamide and a polyacetal and (C) an organic phosphite compound having the formula (I):

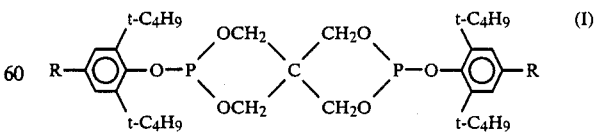

in which R is an alkyl having 1 to 9 carbon atoms.

It is preferable that the composition comprises 100 parts by weight of (A) or (B) and 0.001 to 10 parts by weight of (C), more preferably 0.01 to 3 parts by weight.

The organic phosphite compound (C) to use in the invention is shown below in detail.

In the compound represented by the above general formula (I), examples of the alkyl group represented by R include methyl, ethyl, propyl, isopropyl, butyl, sec-butyl, tert-butyl, isobutyl, amyl, tert-amyl, hexyl, octyl, isooctyl, 2-ethylhexyl, tert-octyl, and tert-nonyl groups.

Specific examples of the compounds represented by the above general formula (I) which are used in the present invention include bis(2,6-di-tert-butyl-4-methylphenyl) pentaerythritol diphosphite, bis(2,6-di-tert-butyl-4-ethylphenyl) pentaerythritol diphosphite, bis(2,6-di-tert-butyl-4-isopropylphenyl) pentaerythritol diphosphite, bis(2,4,6-tri-tertbutylphenyl) pentaerythritol diphosphite, bis(2,6-di-tert-butyl-4-sec-butylphenyl) pentaerythritol diphosphite, bis(2,6-di-tert-butyl-4-tert-octylphenyl) pentaerythritol diphosphite, and bis(2,6-di-tert-butyl-4-tert-nonylphenyl) pentaerythritol diphosphite.

The composition of the invention includes two embodiments. One comprises (A) and (C). The other comprises (B) and (C). Each embodiment is illustrated below.

Thus the present invention provides an improved polyester polymer blend composition comprising a polymer blend composed of a polyester resin and a polycarbonate resin, characterized in that said polymer blend further comprises an organic phosphite compound represented by the following general formula (I).

The present invention exhibits a particularly significant effect when applied to a polymer blend composition composed of a polyester and a polycarbonate mainly comprising polybutylene terephthalate having relatively excellent crystallization properties and thermal stability. Further, the present invention enables a further improvement of a polyester polymer blend composed mainly of polyethylene terephthalate or the like as well and, therefore, is advantageous from the practical viewpoint.

Representative examples of the polyester used in the present invention include polyethylene terephthalate and polybutylene terephthalate. It is noted in this connection that the terephthalic acid component or the glycol component may be partially substituted with other comonomer components. Examples of the comonomer components include bifunctional dicarboxylic acids such as isopththalic, nathphalenedicarboxylic, diphenoxyethanedicarboxylic, adipic, sebacic, and cyclohexanedicarboxylic acids. Examples of the diol component include ethylene, triethylene, tetramethylene, hexamethylene, polyethylene, polypropylene, and polytetramethylene glycols, and a copolyglycol of polyethylene glycol with polypropylene glycol. It is a matter of course that these polyesters may be used in the form of a mixture of two or more of them.

Preferable polyesters include polyethylene terephthalate or a crystalline thermoplastic polyester comprising 80 mol% or more of ethylene terephthalate repeating units, and polybutylene terephthalate or a crystalline thermoplastic polyester comprising 80 mol% or more of butylene terephthalate repeating units.

The polycarbonate resin used in the present invention is at least one homo- or copolycarbonates selected from among bisphenol A, nucleus-alkylated derivatives thereof, and nucleus-halogenated derivatives thereof.

There is no particular limitation with respect to the proportions of the polyester resin and the polycarbonate resin in the polymer blend of the present invention. However, it is generally preferred that the proportions of the polyester resin and the polycarbonate resin be 10 to 90% by weight and 90 to 10% by weight, respectively.

Further, in order to improve the impact resistance of the above-described polymer blend, it is possible to incorporate an impact resistance improver, e.g., other polymer(s) such as maleic anhydride-modified polyolefin. In this case, said other polymer(s) may be incorporated in an amount of 50% by weight based on the whole resin components.

Thus the present invention provides an improved engineering plastic composition comprising (b-1) an α-methylstyrene-modified ABS resin, (b-2) at least one resin selected from among polycarbonate, saturated polyester, polyphenylene ether, polyamide, and polyacetal resins, and (C) an organic phosphite compound represented by the following general formula (I).

The α-methylstyrene-modified ABS resins used in the present invention are those prepared by a method which comprises blending a diene polymer with an ABS resin, i.e., a product of graft polymerization of styrene with acrylonitrile, and an α-methylstyrene/acrylonitrile copolymer, an α-methylstyrene/acrylonitrile/styrene copolymer, an α-methylstyrene/acrylonitrile/2,5-dichlorostyrene copolymer or an α-methylstyrene/acrylonitrile/methyl acrylate copolymer, a method which comprises grafting styrene and acrylonitrile to a diene rubber latex and then grafting α-methylstyrene and acrylonitrile, a method in which styrene in the NBR/AS blend is partially replaced with α-methylstyrene, a method which comprises blending a butadiene/acrylonitrile/styrene copolymer with an α-methylstyrene/acrylonitrile copolymer, etc. They have each a high thermal deformation temperature (generally about 100° C. or above).

The α-methylstyrene content of the α-methyl-styrene-modified ABS resin is preferably 15 to 70% by weight, particularly preferably 30 to 60% by weight.

There is no particular limitation with respect to the amount of incorporation of the α-methylstyrene-modified ABS resin in the above-described engineering plastic. However, the α-methylstyrene-modified ABS resin is generally incorporated in an amount of 5 to 70% by weight, particularly 10 to 60% by weight based on the whole resin components.

The polycarbonate resin used in the present invention is at least one homo- or copolycarbonate selected from among bisphenol A, nucleus-alkylated derivatives thereof, and nucleus-halogenated derivatives thereof.

Examples of the saturated polyester resin used in the present invention include homopolymers, such as polyethylene terephthalate, polypropylene terephthalate, polybutylene terephthalate, polyneopentylene terephthalate, polyhexylene terephthalate, polyethylene naphthalate, polyhexylene naphthalate, and poly-p-ethylenoxybenzoate, and products of substitution of part of the above-described acid and/or alcohol component(s) with other comonomer component(s). Examples of the comonomer component include, besides the above-mentioned terephthalic and naphthalenedicarboxylic acids, dicarboxylic acids, such as phthalic, isophthalic, 4,4'-phenoxyethanedicarboxylic, and adipic acids; and, besides the above-described glycols, glycols, such as 1,10-decanediol, 1,4-cyclohexanedimethanol, diethylene glycol, and polyethylene glycol.

Examples of the polyphenylene ether resin used in the present invention include a polymer prepared by oxidative polycondensation of a phenol compound represented by the following formula:

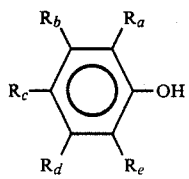

wherein $R_a$ in a hydrogen atom, an alkyl group, an alkoxy group, a haloalkyl group, or a haloalkoxy group, $R_b$, $R_d$, and $R_e$ are each a group represented by $R_a$ or a halogen atom and $R_c$ is a hydrogen atom or a halogen atom; a graft copolymer prepared by polymerizing other polymerizable monomer(s) (e.g., styrene, ethylene, propylene, or butadiene) in the presence of the above-described polymer; or a copolymer prepared by oxidative coupling of the above-described phenolic compound in the presence of other polymer(s) such as polystyrene, styrene copolymer, polycarbonate, polysulfone, nylon, polyolefin, and rubbery polymer.

Examples of the polyamide used in the present invention include all polyamides, e.g., polymers such as ε-caprolactam, aminocaproic acid, enantholactam, 7-aminoheptanoic acid, 11-aminoundecanoic acid, 9-aminononanoic acid, α-pyrrolidone, and α-piperidone; polymers or copolymers prepared by polycondensation of diamines, such as hexamethylenediamine, nonamethylenediamine, undecamethylenediamine, dodecamethylenediamine, or m-xylenediamine, with dicarboxylic acids, such as terephthalic, isophthalic, adipic, sebacic, dodecanedicarboxylic, or glutaric acid; and mixtures of these polymers or copolymers.

The polyacetal resin used in the present invention is a resin prepared by using a cyclic oligomer, such as formaldehyde monomer, trimer thereof (trioxane), or tetramer thereof (tetraoxane), as a starting material and include a copolymer of an oxymethylene homopolymer and the above-mentioned formaldehydes with a cyclic ether, such as ethylene oxide or glycols.

It is preferred that the composition of the present invention be used in combination with a phenolic antioxidant.

Examples of the phenolic antioxidant include 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl4-hydroxybenzyl)phosphonate, thiodiethylene glycol bis[(3,5-di-tert-butyl-4-hydroxyphenyl)propionate], 4,4'-thiobis(6-tert-butyl-m-cresol), 2-octylthio4,6-di(3,5-dihydroxyphenoxy)-s-triazone, 2,2'methylenebis(4-methyl-6-tert-butylphenol), 2,2'-methylenebis(4-ethyl-6-tert-butylphenol), bis[3,-3bis(4-hydroxy-3-tert-butylphenyl)butyric acid] glycol ester, 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[-methylene-3-(3,5-di-tert-butyl-4-hydroxyphenyl)propionate]methane, 2-tert-butyl-4-methyl-6-(2'-acryloyloxy-3'-tert-butyl5'-methylbenzyl)phenol, and 3,9-bis(1',1'dimethyl-2'-hydroxyethyl)-2,4,8,10-tetraoxaspiro[5.5]undecanebis[β-(3-tert-butyl-4-hydroxy-5-methylphenyl)propionate].

The amount of addition of these phenolic antioxidants is 0.001 to 5 parts by weight, preferably 0.01 to 3 parts by weight based on 100 parts by weight of the resin.

A further improvement in the light resistance of the composition of the present invention can be attained by adding a light stabilizer thereto.

Examples of the light stabilizer include 2-hydroxybenzophenones such as 2-hydroxy-4-methoxybenzophenone, 2-hydroxy-4-n-octoxybenzophenone, 2,2'-di-hydroxy-4-methoxybenzophenone, and 2,4-dihydroxybenzophenone; benzotriazoles such as 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, and 2-(2'-hydroxy-3',5'-di-tert-amylphenyl)-benzotriazole; benzoates such as phenyl salicylate, p-tert-phenyl salicylate, 2,4-di-tert-butylphenyl 3,5-di-tert-butyl-4-hydroxybenzoate, and hexadecyl 3,5-di-tert-butyl-4-hydroxybenzoate; nickel compounds such as nickel salts of 2,2'-thiobis(4-tert-octylphenol), [2,2'-thiobis(4-tert-octylphenol)[-n-butylamine, and monoethyl (3,5-di-tert-butyl-4-hydroxybenzyl)phosphonate; piperidine compounds such as bis(2,2,6,6-tetramethyl-4-piperidyl) sebacate, bis(1,2,2,6,6-pentamethyl-4-piperidyl) sebacate, bis(1,2,2,6,6-pentamethyl-4-piperidyl) 2-n-butyl-2-(3,5-di-tert-butyl-4-hydroxvbenzyl-)malonate, bis(1-acryloyl-2,2,6,6-tetramethyl-4-piperidyl) 2,2-bis(3,5-di-tert-butyl-4-hydroxybenzyl)malonate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, 1-hydroxyethyl-2,2,6,6-tetramethyl-4-piperidinol/diethyl succinate condensate, and 2,4-dichloro-6-tert-octylamino-1,3,5-triazine/1,6-bis(2,2,6,6-tetramethyl4-piperidylamino)-hexane condensate; substituted acrylonitriles such as methyl α-cyano-β-methyl-β-(p-methoxyphenyl)acrylate and oxalic dianilides such as N-2-ethylphenyl-N'-2-ethoxy-5-tert-butylphenyl oxalic diamide and N-2-ethylphenyl-N'-2-ethoxyphenyl oxalic diamide.

If necessary, the composition of the present invention further comprises a heavy metal inactivator, a metallic soap, a plasticizer, an epoxy compound, a pigment, a filler, a foaming agent, an antistatic agent, a fire retardant, a lubricant, a processing aid, etc.

The present invention will now be described in more detail with reference to the following examples which should not be construed as limiting the scope of the present invention.

EXAMPLE 1

| Blending | |
|---|---|
| polybutylene terephthalate resin | 20 parts by weight |
| polycarbonate resin | 80 parts by weight |
| organic phosphite compound (see Table 1) | 0.3 part by weight |

The above components were dry blended. The dry blend was extruded at 260° C. to form pellets. The pellets were injection molded at 300° C. to prepare a specimen. With respect to the specimen prepared by the adoption of residence within the injection molder and the specimen prepared without residence in the injection molder, the Izod impact value (23° C., notched)

and the color difference (ΔE) were measured. The results are shown in Table 1.

TABLE 1

| No. | Organic phosphite compound* | Izod impact value (kg · cm/cm) | | Color difference |
|---|---|---|---|---|
| | | Without residence | After residence for 20 min. | |
| Comp. Ex. 1-1 | P-1 | 75 | 45 | 6.3 |
| Ex. 1-1 | P-2 | 80 | 63 | 2.1 |
| Ex. 1-2 | P-3 | 78 | 59 | 3.0 |

Note:
*P-1: distearyl pentaerythritol diphosphite
P-2: bis(2,6-di-tert-butyl-4-methylphenyl) pentaerythritol diphosphite
P-3: bis(2,6-di-tert-butyl-4-ethylphenyl) pentaerythritol diphosphite

EXAMPLE 2

The same tests as those of Example 1 were conducted by using the following blends. The results are shown in Table 2.

| Blending | |
|---|---|
| polybutylene terephthalate resin | 70 parts by weight |
| polycarbonate resin | 10 parts by weight |
| maleic anhydride-modified ethylene/butene-1 copolymer | 20 parts by weight |
| organic phosphite compound (see table 2) | 0.5 part by weight |

TABLE 2

| No. | Organic phosphite compound | Izod impact value (kg · cm/cm) | | Color difference |
|---|---|---|---|---|
| | | Without residence | After residence for 20 min. | |
| Comp. Ex. 2-1 | P-1 | 15.8 | 6.7 | 6.8 |
| Ex. 2-1 | P-2 | 17.4 | 11.2 | 2.0 |
| Ex. 2-2 | P-3 | 17.2 | 10.9 | 2.5 |

EXAMPLE 3

Blending

| | |
|---|---|
| polybutylene terephthalate resin | 75 parts by weight |
| polycarbonate resin | 25 parts by weight |
| tetrakis[methylene-3-(3,5-di-tert-butyl-4-hydroxyphenyl)propionate] methane | 0.5 part by weight |
| pentaerythritol tetralaurylthiopropionate | 2.0 part by weight |
| organic phosphite compound (see Table 3) | 0.5 part by weight |

The above components were dry blended. The dry blend was extruded at 260° C. to form pellets. The pellets were injection molded to prepare a specimen With respect to the specimen prepared by the adoption of residence within the injection molder and the specimen prepared without residence in the injection molder, the Izod impact value (23° C., notched) and the color difference (ΔE) were measured. The results are shown in Table 3.

TABLE 3

| No. | Organic phosphite compound | Izod impact value (kg · cm/cm) | | Color difference |
|---|---|---|---|---|
| | | Without residence | After residence for 20 min. | |
| Comp. Ex. 3-1 | P-1 | 183 | 76 | 4.4 |
| Ex. 3-1 | P-2 | 196 | 128 | 2.1 |
| Ex. 3-2 | P-3 | 192 | 125 | 2.3 |

EXAMPLE 4

| Blending | |
|---|---|
| polycarbonate resin | 50 parts by weight |
| α-methylstyrene-modified ABS resin*1 | 50 parts by weight |
| 1,3,5-tris(3,5-di-tert-butyl-4-hydroxybenzyl) isocyanurate | 0.3 part by weight |
| organic phosphite compound (see Table 4) | 0.3 part by weight |

Note: *1 an α-methylstyrene content of 37.5%

The above components were dry blended. The dry blend was extruded at 260° C. to form pellets. The pellets were injection molded at 280° C. without residence or after residence for 5 min within an injection molder, thereby preparing a specimen. The Izod impact value at 23° C. (notched) and the color difference (ΔE) of the specimen were measured. The results are shown in Table 4:

TABLE 4

| No. | organic phosphite compound | Izod impact value (kg · cm/cm) | | color difference |
|---|---|---|---|---|
| | | without residence | after residence for 5 min. | |
| Comp. Ex. 4-1 | none | 30 | 10 | 12.3 |
| Comp. Ex. 4-2 | P-1 | 37 | 16 | 9.8 |
| Ex. 4-1 | P-2 | 52 | 34 | 6.4 |
| Ex. 4-2 | P-3 | 50 | 31 | 6.7 |

EXAMPLE 5

The same tests as those of Example 4 were conducted by using the following blends. The results are shown in Table 5.

| Blending | |
|---|---|
| polybutylene terephthalate resin | 80 parts by weight |
| α-methylstyrene-modified ABS resin | 20 parts by weight |
| 1,3,5-tris(3,5-di-tert-butyl-4-hydroxybenzyl) isocyanurate | 0.3 part by weight |
| organic phosphite compound (see Table 5) | 0.3 part by weight |

TABLE 5

| No. | organic phosphite compound | Izod impact value (kg · cm/cm) | | color difference |
|---|---|---|---|---|
| | | without residence | after residence for 5 min. | |
| Comp. | P-1 | 49 | 13 | 6.2 |

TABLE 5-continued

| No. | organic phosphite compound | Izod impact value (kg · cm/cm) without residence | Izod impact value (kg · cm/cm) after residence for 5 min. | color difference |
| --- | --- | --- | --- | --- |
| Ex. 5-1 | | | | |
| Ex. 5-1 | P-2 | 58 | 35 | 4.4 |
| Ex. 5-2 | P-3 | 55 | 33 | 4.7 |

EXAMPLE 6

The tests were conducted in the same way as shown in Example 4 by using the following blends. Results are shown in Table 6.

| Blending | |
| --- | --- |
| nylon 6 | 75 parts by weight |
| α-methylstyrene-modified ABS resin | 25 parts by weight |
| tetrakis[methylene-3-(3,5-di-tert-butyl-4-hydroxyphenyl)-propionate]methane | 0.3 part by weight |
| organic phosphite compound (see Table 6) | 0.3 part by weight |

TABLE 6

| No. | organic phosphite compound | Izod impact value (kg · cm/cm) without residence | Izod impact value (kg · cm/cm) after residence for 5 min. | color difference |
| --- | --- | --- | --- | --- |
| Comp. Ex. 6-1 | P-1 | 85 | 12 | 9.7 |
| Ex. 6-1 | P-2 | 98 | 50 | 4.3 |
| Ex. 6-2 | P-3 | 96 | 47 | 4.5 |

EXAMPLE 7

The tests were conducted in the same way as shown in Example 4 by using the following blends. Results are shown in Table 7.

| Blending | |
| --- | --- |
| polyphenylene ether resin | 75 parts by weight |
| α-methylstyrene-modified ABS resin | 25 parts by weight |
| 1,3,5-tris(3,5-di-tert-butyl-4-hydroxybenzyl) isocyanurate | 0.3 part by weight |
| organic phosphite compound (see Table 7) | 0.3 part by weight |

TABLE 7

| No. | organic phosphite compound | Izod impact value (kg · cm/cm) without residence | Izod impact value (kg · cm/cm) after residence for 5 min. | color difference |
| --- | --- | --- | --- | --- |
| Comp. Ex. 7-1 | P-1 | 23 | 9 | 6.1 |
| Ex. 7-1 | P-2 | 32 | 18 | 3.7 |
| Ex. 7-2 | P-3 | 30 | 17 | 3.9 |

Note: *the same compounds as those listed in Table 4

What is claimed is:

1. A polymer composition which comprises
(A) a polymer blend comprising (a-1) a polyester and (a-2) a polycarbonate or
(B) a polymer blend comprising (b-1) α-methylstyrene-modified ABS resin and (b-2) at least one polymer selected from a polycarbonate, a saturated polyester, polyphenylene ether, a polyamide and a polyacetal and
(C) an organic phosphite compound having the formula (I):

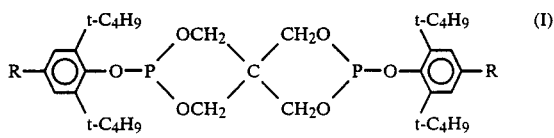

in which R is an alkyl having 1 to 9 carbon atoms, said polymer composition comprising 100 parts by weight of (A) or (B) and 0.001 to 10 parts by weight of (C).

2. A polymer composition as claimed in claim 1 which comprises (A) and (C).

3. A polymer composition as claimed in claim 1 which comprises (B) and (C).

* * * * *